United States Patent [19]

Wan

[11] Patent Number: 4,836,927
[45] Date of Patent: Jun. 6, 1989

[54] RECOVERY OF DEWAXING AID USING ASYMMETRIC POLYIMIDE ULTRAFILTRATION MEMBRANE AND METHOD FOR PRODUCING SAID MEMBRANE

[75] Inventor: Wan-Kei Wan, Sarnia, Canada

[73] Assignee: Exxon Research and Engineering Company, Florham Park, N.J.

[21] Appl. No.: 172,753

[22] Filed: Mar. 28, 1988

[51] Int. Cl.$^4$ .............................................. B01D 13/00
[52] U.S. Cl. ...................................... 210/651; 210/654
[58] Field of Search ............... 210/651, 638, 654, 637; 585/819, 446; 208/45, 180, 308; 423/447.4, 449, 444

[56] References Cited

U.S. PATENT DOCUMENTS

| | | | |
|---|---|---|---|
| 3,708,458 | 1/1973 | Alberino et al. | 260/65 |
| 3,925,211 | 12/1975 | Schumann et al. | 210/500 M |
| 4,192,732 | 3/1980 | Onodera et al. | 208/33 |
| 4,240,914 | 12/1980 | Iwama et al. | 210/500.2 |
| 4,307,135 | 12/1981 | Fox | 427/244 |
| 4,358,378 | 11/1982 | Iwama et al. | 210/500.2 |
| 4,378,324 | 3/1983 | Makino et al. | 264/41 |
| 4,385,084 | 5/1983 | Iwama et al. | 427/244 |
| 4,528,004 | 7/1985 | Makino et al. | 55/158 |
| 4,532,041 | 7/1985 | Shuey et al. | 210/500.2 |
| 4,571,444 | 2/1986 | Black et al. | 208/308 |
| 4,606,903 | 8/1986 | Hafez et al. | 208/45 |

FOREIGN PATENT DOCUMENTS

| | | |
|---|---|---|
| 036315 | 9/1981 | European Pat. Off. . |
| 037730 | 10/1981 | European Pat. Off. . |
| 146298 | 6/1985 | European Pat. Off. . |
| 154746 | 9/1985 | European Pat. Off. . |
| 2051664 | 1/1981 | United Kingdom . |
| 2073654 | 10/1981 | United Kingdom . |
| 2098994 | 12/1982 | United Kingdom . |
| 2101137 | 1/1983 | United Kingdom . |
| 2104411 | 3/1983 | United Kingdom . |

OTHER PUBLICATIONS

"High-Temperature Ultrafiltration Membrane", Sarbolouki, JPL Invention Report 30-4918/NPO-15431, 1982.
"New Polyimide Ultrafiltration Membrane for Organic Use", Iwama, et al, Journal of Membrane Science 11 (1982), 297–309.

Primary Examiner—Frank Sever
Attorney, Agent, or Firm—Joseph J. Allocca

[57] ABSTRACT

Dewaxing aids used to assist in the solvent dewaxing of waxy hydrocarbon oils are recovered from the dewaxed oil or waxy precipitate, or both, by selective permeation of the oil or wax through a perm-selective polyimide ultrafiltration membrane, under ultrafiltration conditions, leaving a retentate of dewaxing aid, or reduced oil and/or wax content, which dewaxing aid-rich retentate can be recycled to the solvent dewaxing process.

4 Claims, No Drawings

RECOVERY OF DEWAXING AID USING ASYMMETRIC POLYIMIDE ULTRAFILTRATION MEMBRANE AND METHOD FOR PRODUCING SAID MEMBRANE

BACKGROUND OF THE INVENTION

Hydrocarbon oils, derived from paraffinic petroleum basestocks, and even from sources such as tar sands or shale oils, are useful for lubricants and specialty oils and even kerosene and jet fuels only when they have had their wax content reduced. Waxes present in such oils are detrimental to oil or fuel performance since if the oil or fuel is subjected to a low enough temperature environment the wax in the oil or fuel solidifies and forms, at best, a haze and, at worst, a high concentration of solid wax which detrimentally affects the pour point and flowability of the oil or fuel.

To this end, many processes have been developed to reduce the wax content of these hydrocarbon oils. At present, most hydrocarbon dewaxing is practiced utilizing solvent dewaxing processes. These processes are many and varied. Thus, dewaxing can be accomplished by mixing the waxy oil with liquid, normally gaseous autorefrigerative solvents, such as propane, butane, etc., and by reducing the pressure and lowering the temperature sufficiently to precipitate out the wax, which may then be separated from the dewaxed oil. Other dewaxing procedures utilized normally liquid dewaxing solvents, such as ketones (e.g., methyl ethyl ketone and methyl isobutyl ketone) and aromatic hydrocarbon (e.g., toluene) and mixtures of both (e.g., MEK/toluene). In procedures utilizing these solvents the oil is mixed with the solvent and chilled, either directly by using cold dewaxing solvent, or indirectly in indirect heat exchanger means, such as scraped surface chillers, to reduce the temperature and thereby precipitate wax from the oil.

These solvent dewaxing processes, while in themselves operable and efficient, have been improved by use of added dewaxing aids which act as nucleation centers for the wax during wax precipitation and result in production of wax particles which are more readily separable from the oil, i.e., waxes which can be filtered more efficiently from the oil as evidenced by improvements in feed filter rate and liquids/solids ratio of the dewaxed oil.

These dewaxing aids are high molecular weight polymeric materials and include chlorinated paraffins and naphthalene condensation products, poly- alkyl acrylate and methacrylates, alkylfurmarates-vinylacetate copolymers, polyethylene oxides, polyvinyl pyrrolidones, polyisobutylenes, alkali metal stearates, etc. These polymeric materials are of high molecular weight, ranging from 1,000 to 5,000,000, typically 2,000 to 1,000,000, more typically 5,000 to 500,000. They are used in amounts of from 0.01 to 5 weight percent active ingredient based on waxy oil, typically 0.01 to 2 weight percent, most typically 0.1 to 1.0 weight percent, active ingredient based on waxy oil feed.

In general, these dewaxing aids are costly chemicals and, to the despair of refineries, have in the past been left in the wax or oil. Typical precedures for recovery of one material from another, such as distillation, have not usually been desirable or successful since the temperature employed in such distillation degrade the polymers, rendering the recovered material of rather limited usefulness. Vacuum distillation is more attractive and has been employed and is covered by U.S. Pat. No. 4,192,732. The disadvantage of even this successful process, however, resides in the fact that it employs distillation, which necessitates the expenditure of energy to heat the oil or wax to effect the separation of the dewaxing aid from said oil and/or wax and requires vacuum equipment.

It would be preferred if a non-degenerative process could be employed which is not energy intensive, which produces a stream of recovered dewaxing aid which has retained its potency and can be recycled for re-use to the solvent dewaxing process.

The use of membrane processes to separate oil and/or wax from dewaxing aid by permeation of the oil and/or wax molecules through a permeable selective membrane has been described in U.S. Ser. No. 588,236 (see EP No. 84308369.2 and U.S. Ser. No. 666,385 (see EP No. 84308368.4). These applications indicate that dewaxing aid can be recovered by permeation of oil/wax molecules through permselective membranes under ultrafiltration conditions and the recovered dewaxing aid retains its potency and can be recycled to the dewaxing process.

However, despite these showings of operability, it would be extremely desirable if the process could be made more efficient, if it could be run at higher temperature and/or higher pressure so as to achieve higher productivity, as well as securing a higher purity recovered dewaxing aid retentate.

To this end a new polymeric material has been identified and suitable membrane prepared which permits operation of the membrane separation ultrafiltration process at higher temperatures to achieve higher productivity.

The Present Invention

It has been discovered that polyimide ultrafiltration membranes can be employed to separate wax and/or oil from dewaxing aid to yield a retentate stream containing an increased concentration of dewaxing aid (and conversely a reduced concentration of wax and/or oil), said recovered dewaxing aid being a high potency material which can be recycled to the dewaxing process. The separation process itself can be run at higher temperatures and/or pressures than employed in the previously described membrane processes to achieve significantly higher productivity. The polyimide ultra-filtration membrane used in the process is preferably prepared by a technique employing a dual solvent casting solution.

Polyimide that can be converted into the membrane form with the appropriate pore size would include those commercially available from Dow (Upjohn) as 2080 and from Ciba Geigy as XU-218. Other polyimides described in the literature including U.S. Pat. No. 4,240,914, U.S. Pat. No. 4,378,324 and U.S. Pat. No. 3,925,211 are also suitable.

Asymmetric polyimide ultrafiltration membranes are the subject of numerous articles and patents. References to such polyimide ultrafiltration membranes and to methods for their preparation may be found in U.S. Pat. No. 4,240,914, U.S. Pat. No. 4,378,324, GB Pat. No. 2,073,654, GB Pat. No. 2,051,664, "New Polyimide Ultrafiltration Membranes for Organic Use", Iwama, et al., Journal of Membrane Science, II (1982) 297–309, European Application 81301480.0 (Publication No. 037730), U.S. Pat. No. 3,925,211.

In the present invention, the preferred polyimide is the aromatic, fully imidized, highly polar polyimide copolymer available from Dow, (formerly Upjohn), and described in U.S. Pat. No. 3,708,458.

The polymer is a copolymer derived from the co-condensation of benzophenone 3,3',4,4'-tetracarboxylic acid dianhydride (BTDA) and a mixture of di(4-aminophenyl)methane and toluene diamine or the corresponding diisocyanates, 4,4'-methylenebis (-phenyl isocyanate) and toluene diisocyanate.

The obtained copolyimide has imide linkages which may be represented by the structural formulae:

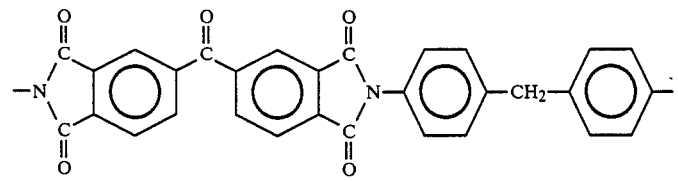

I and

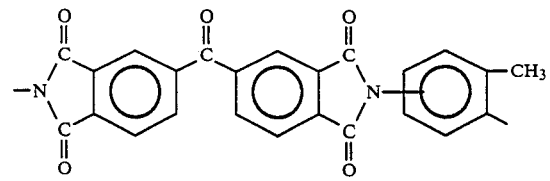

II wherein the copolymer comprises from about 10 to 90% I and 90 to 10% II, preferably about 20% I and about 80% II. Polymer preparation is described in U.S. Pat. No. 3,708,458.

In producing a membrane possessing high flux and high selectivity (in a reproducible and consistent manner) which is also highly durable and flexible, it is preferred that the polyimide starting material out of which the membrane is cast be in a non-degraded form. As used in the body of this specification and the accompanying claims the descriptive phrases "non-degraded form" or "undegraded" means that the polyimide copolymer has been precipitated from its synthesis solution using a non-aqueous solvent, or if isolated from its solution using water or an aqueous solvent, it must have been recovered from the water or aqueous solvent as quickly as possible to insure minimum polymer deterioration. To this end the best commercial sources of polyimide copolymer satisfying this requirement of the present invention are Dow's (formerly Upjohn Company's) 2080D, which is an about 22% solution of the polymer in N,N-dimethylformamide (DMF) solvent and 2080 DHV which is an about 25% solution of the polymer in DMF solvent. These solutions are the polymerization reaction product solutions without further processing and are sold as such. The polyimide copolymer in this solution is recovered for use in the membrane preparation procedure (described below) by precipitation from the DMF solvent using an anti-solvent which is non-aqueous and a non- solvent for the polymer, but which is miscible with DMF, e.g. methanol, acetone, MEK, toluene, preferably acetone. The polymer is redissolved in the appropriate pro-solvent/anti-solvent pair at the desired solvent ratio and polymer loading level to give a casting solution suitable for the production of ultrafiltration membranes.

In producing the ultrafiltration membrane used in the present invention the polyimide polymers, preferably undegraded polyimide 2080, is dissolved in a dual solvent system comprising a pro- solvent and an anti-solvent. the pro-solvent can be any solvent which is a good solvent for the polyimide polymers, but is preferably selected from the group dimethylsulfoxide (DMSO), N,N-dimethylformamide (DMF), N,N-dimethylglacitamide (DMAC) and N-methylpyrrolidone (NMP) and mixtures thereof. DMAC is preferred. The anti-solvent can be any solvent in which the polymer is insoluble, but with which it is compatible. Typical of such anti-solvents are simple organic solvents such as alcohols, ketones, ethers, and esters. Methyl alcohol, acetone, dioxane, morpholine, sulfolane, γbutyrolactone and ethylacetate are examples of anti-solvents. Dioxane is preferred.

The pro-solvent/anti-solvent pair is used in a ratio of between about 10:1 to 1:1; preferably 7:1 to 1:1; more preferably 5:1 to 2:1; most preferably 3:1.

From 12 to 20 wt. % polyimide polymer is dissolved in the pro-/anti-solvent pair.

Inorganic salts such as lithium chloride, sodium chloride, lithium perchlorate, magnesium perchlorate, etc. is also used, at from 1 to 6 wt. %, preferably 2 to 4 wt. %.

The resulting casting solution is characterized by being clear, non turbid in appearance.

The casting solution is cast onto a suitable support, such as a glass plate, metal plate, moving woven or non-woven fabric backing, permitted to evaporate for from 1 to 60 sec. preferably 10 to 40 sec, then quenched in a suitable quenching solvent, such as water.

Prior to use in the present dewaxing aid recovery process, the polyimide ultrafiltration membrane is washed to remove the quenching solvent, (e.g. water), such washing employing solvents such as alcohols (e.g. isopropanol, ethanol, etc.) or ketones (e.g. acetone, MEK), followed by a hydrocarbon solvent (such as heptane, hexane, octane, etc.)

In practicing the separation of dewaxing aid (DWA) from the oil and/or wax, the mixture of oil-DWA and/or wax-DWA coming from the dewaxing operation is heated so as to be in the liquid state. For the wax-DWA system, this heating should be up to the temperature at which the hardest wax in the mixture melts and can typically be as high as 275°-325° F., but more realistically heating up to 200°-225° F. is sufficient.

The liquified mixture of oil-DWA and/or wax-DWA is contacted with the thin, dense side of the polyimide ultrafiltration membrane at a temperature of about 70° C. to 250° C., preferably about 100° C. to 200° C., at elevated pressure, typically an applied pressure of about 5–200 psi, preferably about 10–100 psi.

The following examples serve to further illustrate the present invention:

(Preparation of Membrane)

(A) Membrane Casting Solution

A membrane casting solution consisting of 17% undegraded Dow (Upjohn) 2080 polyimide, 3% lithium chloride and 80% dual solvent consisting of DMAC and dioxane in the ratio of 3/1 was stirred overnight at room temperature, filtered and degassed prior to membrane casting. This casting solution is a non turbid, clear solution of polymer in solvent.

(B) Membrane Preparation

The above solution was cast on to a glass plate using a knife with (250μ) gap width and quenched in water after allowing an evaporation time of 17 seconds.

(C) Prior to using the membrane for wax-dewaxing aid separation, the membrane was washed with isopropanol and n-heptane.

EXAMPLE 1

The ultrafiltration polyimide membrane described above was used to recover dewaxing aid from a bright stock wax containing 0.3% dewaxing aid at temperatures ranging from 85°–150° C. Results are collected in the following Table 1 and compared with those obtained with a polysulfone membrane.

TABLE 1

|  | Temperature (°C.) | Flux (b) (1/m² day) | Rejection (c,d) (%) |
|---|---|---|---|
| Polyimide | 85 | 35 | 100 |
|  | 100 | 62 | 100 |
|  | 150 | 225 | 100 |
| E500 (a) | 85 | 32 | 100 |
| (Polysulfone) | 100 | 47 | 100 |
|  | 150 | 179 | 100 |

Notes:
(a) E500 is a polysulfone membrane on a non woven backing from Desalination Systems Inc.
(b) As measured six hours after start-up of experiment at 20 psig.
(c) Dewaxing aid used is a 50/50 mixture of polyalkylmethacrylates (available as ECA 9368 from Exxon Chemical Company) and vinyl-acetate-dialkylfurmarate copolymers (available as ECA 9555 from Exxon Chemical Company).
(d) Dewaxing aid is not detectable in permeate.

EXAMPLE 2

The ultrafiltration polyimide membrane described above was used to recover dewaxing aid from a bright stock slack wax containing 5% dewaxing aid (same aid as in Example 1) at temperatures ranging from 85°–200° C. Results are collected in the following Table 2 and compared with those obtained with a polysulfone membrane.

TABLE 2

|  | Temperature (°C.) | Flux (b) (1/m² day) | Rejection (c) (%) |
|---|---|---|---|
| Polyimide | 85 | 23 | 100 |
|  | 100 | 30 | 100 |
|  | 150 | 140 | 100 |
|  | 200 | 307 | 100 |
| E500 (a) | 85 | 25 | 100 |
| (Polysulfone) | 100 | 40 | 100 |
|  | 150 | 135 | 100 |

TABLE 2-continued

|  | Temperature (°C.) | Flux (b) (1/m² day) | Rejection (c) (%) |
|---|---|---|---|
|  | 200 | (d) | (d) |

Notes:
(a) As defined in Example 2, footnote (a).
(b) As measured six hours after start-up of experiment at 20 psig.
(c) As defined in Example 1, footnote (d).
(d) Membrane melted.

Thus by operating the separation at 200° C., which is possible with the use of the polyimide membrane, productivity of the process is more than doubled compared to the use of the polysulfone membrane at 150° C.

EXAMPLE 3

An ultrafiltration polyimide membrane was tested under the same conditions as in Example 2, except that the temperature was maintained at 200° C. over a period of approximately 200 hours. Results are reported in the following Table 3.

TABLE 3

|  | Time (hours) | Flux (a) (1/m² day) | Rejection (b) (%) |
|---|---|---|---|
| Polyimide | 6 | 307 | 100 |
|  | 50 | 262 | 100 |
|  | 75 | 250 | 100 |
|  | 99 | 248 | 100 |
|  | 115 | 246 | 100 |
|  | 160 | 251 | 100 |
|  | 182 | 228 | 100 |

Notes:
(a) Operating pressure 20 psig.
(b) As defined in Example 1, footnote (d).

These results show that the membrane has good flux maintenance over time at 200° C.

What is claimed is:

1. In a method for recovering dewaxing aids used in the solvent dewaxing of waxy hydrocarbon oils wherein the dewaxing aid is present in a dewaxed oil stream, a precipitated wax stream or both and wherein the dewaxing aid present in said dewaxed oil stream, precipitated wax stream or both is recovered by heating said stream so that the wax is in the liquid state and contacting said heated stream with an ultrafiltration polymeric membrane to selectively permeate through said membrane the oil or wax components of said heated stream while producing a retentate containing the dewaxing aid which retentate can be recycled to the solvent dewaxing process, the improvement comprising ultrafiltering said stream with a membrane made from polyimide polymer wherein the polyimide ultrafiltration membrane is produced by dissolving the polyimide polymer in a dual component solvent system comprising a pro-solvent and an anti-solvent pair used in a pro-solvent/anti-solvent ratio of between about 10:1 to 1:1 and adding 1 to 6 wt. % inorganic salt to produce a clear, non-turbid casting solution, using said casting solution to produce a thin layer of said polyimide polymer/dual solvent solution mixture, partially evaporating the solvent for from 1 to 60 seconds and thereafter quenching the film in a quenching solvent, and performing the ultrafiltration dewaxing aid recovery process at a temperature of about 70° to 250° C. and an applied pressure of about 5 to 200 psi.

2. The method of claim 1 wherein the polyimide ultrafiltration membrane is made using a casting solution containing 12 to 20 wt. % undegraded polyimide derived from the co-condensation of benzophenone 3,3',4,4'-tetracarboxylic acid dianhydride (BTDA) and a mixture of di(4 aminophenyl) methane and toluene diamine or 4,4'methylenebis (-phenyl isocyanate) and toluene diisocyanate dissolved in a dual solvent system

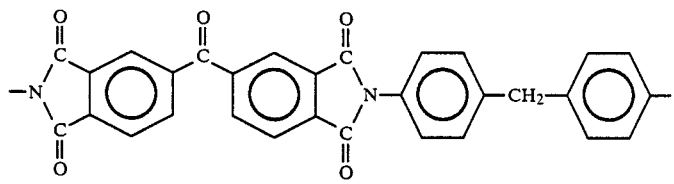

and from 90 to 10% of

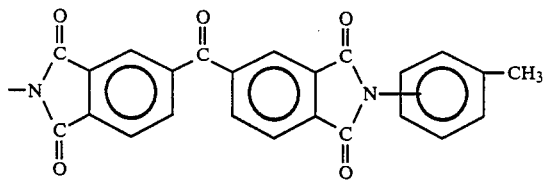

comprising a pro-solvent and an anti-solvent pair used in a pro-anti ratio of between about 10:1 to 1:1 and containing 1 to 6 wt. % inorganic salt, said casting solution being used to produce a thin layer of said polyimide copolymer/dual solvent solution mixture, partially evaporating the solvent for from 1 to 60 seconds and thereafter quenching the membrane film in a quenching solvent.

3. The method of claim 2 wherein the polyimide ultrafiltration membrane comprises from 10 to 90% of 4. The method of claim 3 wherein the polyimide ultrafiltration membrane comprises about 20% component (I) and about 80% component (II).

* * * * *